United States Patent [19]
Hamada et al.

[11] Patent Number: 5,361,470
[45] Date of Patent: Nov. 8, 1994

[54] PROCESSING APPARATUS WITH MOVABLE PROCESSING TOOL

[75] Inventors: Tutomu Hamada; Takafumi Asada, both of Hirakata; Yoshihiro Ikemoto, Katano; Toru Nakagawa, Hirakata, all of Japan

[73] Assignee: Matsushita Electric Industrial Co., Ltd., Osaka, Japan

[21] Appl. No.: 160,947

[22] Filed: Dec. 3, 1993

[30] Foreign Application Priority Data

Dec. 3, 1992 [JP] Japan ................. 4-323925

[51] Int. Cl.⁵ .................. B23B 7/14; B24B 49/00; B23C 3/00; G05B 19/00
[52] U.S. Cl. ................. 29/27 R; 51/165.71; 82/1.11; 82/118; 82/133; 364/474; 409/166
[58] Field of Search ............. 29/27 R, 27 C, 28; 82/1.11, 158, 133, 118, 134; 51/165.71, 165.77; 409/165, 166, 168; 364/474.29, 474.16, 474.01

[56] References Cited

U.S. PATENT DOCUMENTS

| | | | |
|---|---|---|---|
| 3,834,256 | 9/1974 | Abbatiello | 82/118 X |
| 3,851,550 | 12/1974 | Schalles | 82/118 |
| 4,366,543 | 12/1982 | Feller et al. | 82/1.11 |
| 4,564,914 | 1/1986 | Ballough et al. | 364/474.29 |
| 4,570,387 | 2/1986 | Unno et al. | 51/165.71 |
| 4,584,796 | 4/1986 | Yoneda et al. | 51/165.71 |
| 4,664,570 | 5/1987 | Tsukiji et al. | 409/168 X |
| 4,947,715 | 8/1990 | Council, Jr. | 82/1.11 |
| 5,007,151 | 4/1991 | Gusching | 29/27 C X |
| 5,072,399 | 12/1991 | Lans et al. | 364/474.29 |
| 5,289,660 | 3/1994 | Terasaki et al. | 51/165.71 |

FOREIGN PATENT DOCUMENTS

| | | | |
|---|---|---|---|
| 297593 | 1/1992 | German Dem. Rep. | 51/165.71 |
| 158787 | 12/1979 | Japan | 82/118 |
| 64251 | 4/1984 | Japan | 82/1.11 |
| 180749 | 9/1985 | Japan | 82/118 |
| 38853 | 2/1986 | Japan | 51/165.77 |
| 251001 | 10/1987 | Japan | 82/1.11 |

*Primary Examiner*—William Briggs
*Attorney, Agent, or Firm*—Wenderoth, Lind & Ponack

[57] ABSTRACT

A processing apparatus with a movable processing tool, includes a deflection detecting device, a rotating position detecting sensor, an arithmetic unit, an output circuit, a fine adjustment device, and an XY table. The detecting device detects a plurality of deflection amounts of a processing reference surface of a to-be-processed work held by a work holding member mounted to a main shaft of an NC processing apparatus. The sensor detects a rotating position of the work. The unit calculates a correcting amount of the tool at a processing point of the work from a measured value of the sensor and plural measured values of the deflection amounts of the detecting device. The circuit outputs the correcting amount synchronously with the rotating position and processing point of the work. The adjustment device has the tool fixed thereto for finely moving the tool in a processing direction based on an output from the circuit. The fine adjustment device is secured to the XY table.

19 Claims, 12 Drawing Sheets

PROCESSING APPARATUS WITH MOVABLE PROCESSING TOOL

BACKGROUND OF THE INVENTION

The present invention relates to a processing apparatus with a movable processing tool such as a cutting tool, a milling cutter, and a polishing or lapping tool which has an NC table.

An NC cutting apparatus with an NC table has been widely used lately in order to process parts such as video cylinders or the like with high accuracy.

A conventional NC cutting apparatus of the type referred to above will be described below.

Figure 16:
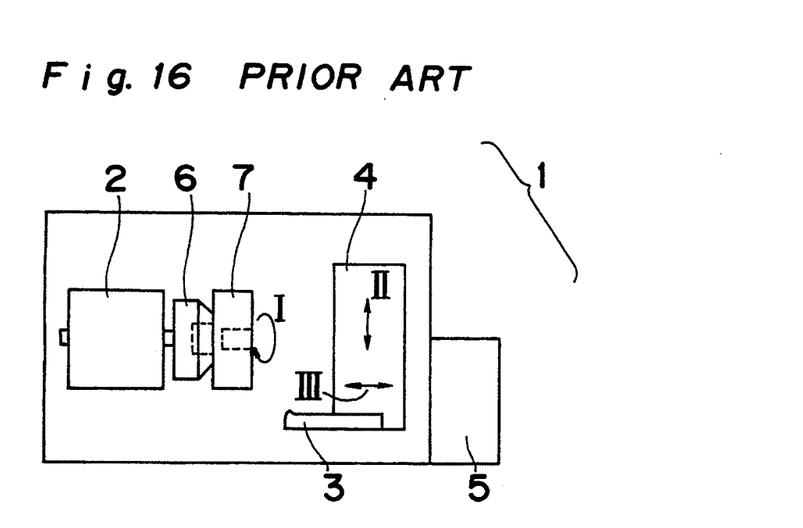
FIG. 16 is a schematic plane view of a conventional NC cutting apparatus.

FIG. 16 is a schematic plane view showing the structure of a conventional NC cutting apparatus, in which element 1 is an NC cutting apparatus and element 2 is a main shaft. A cutting tool 3 of the apparatus 1 is fixed to an NC table 4 by a means (not shown). A control device 5 controls the cutting apparatus 1 and the NC table 4. A chuck 6 mounted to the main shaft 2 holds a work 7 to be cut. It is to be noted here that the work 7 is supposed to be a video cylinder herein so as to make the point clear, and the apparatus is used to fix a shaft 8 of different material which is the rotational center of the work 7 through shrinkage fitting or pressure fitting as shown in FIG. 17.

The NC cutting apparatus 1 in the aforementioned structure operates in a manner as described below.

The work 7 is rotated in a direction of an arrow I following the rotation of the main shaft 2. At this time, the NC table 4 to which the cutting tool 3 is secured is moved in the directions of arrows II and III in accordance with a program preliminarily loaded into the control device 5. Accordingly, the cutting tool 3 bites the work 7, thereby cutting, for example, the outer peripheral surface of the work 7 with high accuracy.

Figure 17:
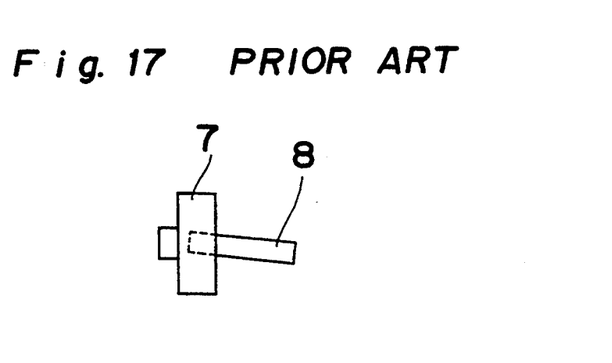
FIG. 17 is a diagram of a completed to-be-cut article.
Figure 18:
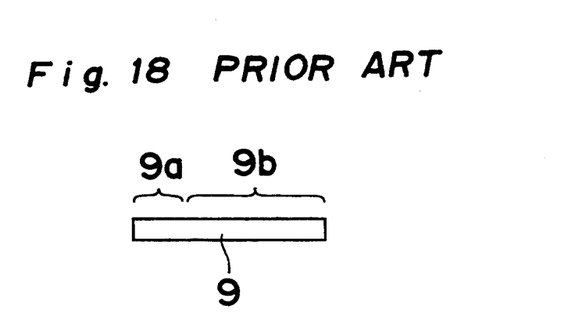
FIG. 18 is a plane view of another to-be-cut article.

In the above-depicted arrangement, however, although the work 7 itself is processed highly accurately, the shaft 8 is disadvantageously inclined to the outer peripheral surface of the work 7 as it is firmly secured to the work 7, as is clearly shown in FIG. 17. The actual inclination of the shaft 8 is on the order of several $\mu$m, but exaggerated in FIG. 17 for the sake of explanation. Since the video tape of a video tape recorder as a final product runs along the outer periphery of the work 7 and moreover, the head part of the video tape recorder rotates around the shaft 8, it is impossible for the video head to correctly trace the video tape when the shaft 8 is inclined, thus resulting in the deterioration of the image quality. Even though this problem would be solved by processing the outer peripheral surface of the work 7 while using the shaft 8 as a processing reference after the shaft 8 is secured to the work 7, it is necessary in the conventional NC cutting apparatus to adjust and set the work 7 by the chuck 6 so that the outer periphery of the inclined shaft 8 is not deflected due to the rotation of the main shaft 2. The adjustment is however a manual work and has a very low efficiency for massproduction. Although the foregoing description is based on the assumption that the work 7 is a video cylinder, the problem is not peculiar to video cylinders. For instance, supposing that the outer periphery of a rod-shaped work 9 of FIG. 18 is to be processed accurately, a part 9b of the work 9 is first processed while a part 9a of the work 9 is held by the chuck 6, and then the part 9a is processed while the part 9b is supported by the chuck 6. When the part 9b is supported by the chuck 6, however, the rotational center of the main shaft 2 is minutely deflected from the center of the part 9b held by the chuck 6, generating a deflection on the order of $\mu$m at a part where the part 9b is not held by the chuck 6. In the meantime, the part 9a is naturally processed at the rotational center of the main shaft 2. As such, it is a commonly-accepted idea that it is impossible to accurately process over the length of the rod-like work 9 by the conventional arrangement. This problem may also be solved in the same manner as in the case of the above video cylinder. In other words, the part 9b is first processed sufficiently longer than it is to be held by the chuck 6, and subsequently the part 9b is adjusted by the chuck 6 in a manner to prevent a part of the part 9b longer than the chuck 6 from deflection when the part 9b is held by the chuck 6. However, this solution alike is poor for mass production because of the dependency on the need for manual assistance.

SUMMARY OF THE INVENTION

The object of the present invention is therefore to provide a processing apparatus with a movable processing tool, which is effective to process a work using a shaft secured to the work as a processing standard or when it is necessary to change the part of the work held by a chuck, that is, when a processing reference surface is deflected in accordance with the rotation of a main shaft.

In accomplishing the object, according to one aspect of the present invention, there is provided a processing apparatus with a movable processing tool, which comprises:

a deflection detecting device for detecting a plurality of deflection amounts at points which are axially spaced on a processing reference surface of a to-beprocessed work which is held by a work holding member mounted to a main shaft of an NC processing apparatus;

a rotating position detecting sensor for detecting a rotating position of the work;

an arithmetic unit for calculating a correcting amount of the processing tool at a processing point of the work from a measured value of the rotating position detecting sensor and a plurality of measured values of the deflection amounts of the deflection detecting device;

an output circuit for outputting the correcting amount synchronously with the rotating position and the processing point of the work;

a fine adjustment device having the processing tool fixed thereto for finely moving the processing tool in a processing direction based on an output from the output circuit; and an XY table to which the fine adjustment device is secured.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Before the description of the present invention proceeds, it is to be noted that like parts are designated by like reference numerals throughout the accompanying drawings.

A cutting apparatus according to a first embodiment of the present invention will be discussed hereinbelow with reference to FIGS. 1 and 2.

Figure 1:
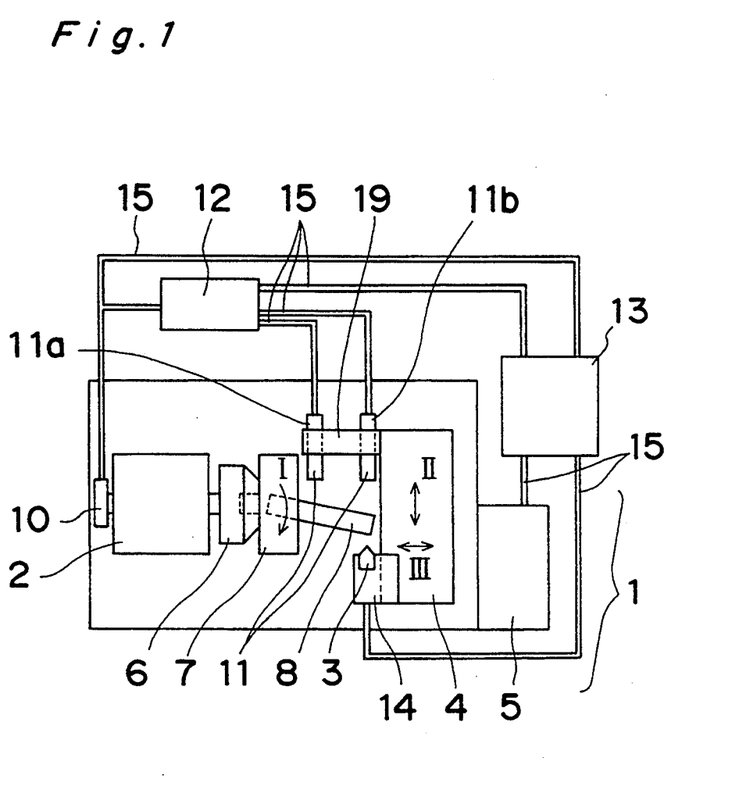
FIG. 1 is a schematic plane view of a cutting apparatus with a movable cutting tool according to a first embodiment of the present invention.
Figure 2:
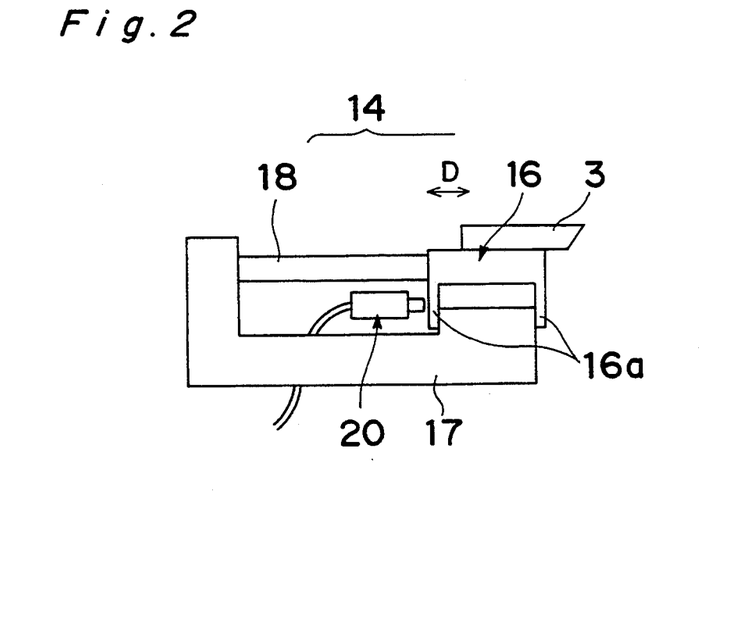
FIG. 2 is a schematic side view of a fine adjustment device of the cutting tool in the apparatus of FIG. 1.

FIG. 1 schematically shows a plane view of a cutting apparatus with a movable cutting tool of the embodiment. The parts of the same function are designated by the same reference numerals in FIG. 1 as in the conventional example. Specifically, reference numerals 1–5 denote respectively an NC (numerical control) cutting apparatus, a main shaft, a cutting tool, an NC table serving as an XY table, and a control device for controlling the NC cutting apparatus 1 and NC table 4. A chuck 6 mounted to the main shaft 2 holds a work 7 to be cut. A shaft 8 is secured to the work 7, and serves as a processing reference for the work 7. The shaft 8 is illustrated to be inclined in FIG. 1 to make clear a deflection thereof subsequent to the rotation of the main shaft 2.

The differences between the present invention and the prior art are described below.

A rotating position detecting sensor 10 for detecting the rotating position of the work 7 is attached to the main shaft 2. Two deflection detecting sensors 11a and 11b are fixed to the NC table 4 via a metal supporter 19. An arithmetic unit 12 calculates the correcting amount of a processing point of the work 7 corresponding to the rotating position of the work 7 on the basis of the output signals from the sensors 10 and 11a and 11b. An output circuit 13 outputs the correcting amount of the cutting point of the work 7 based on the calculation result in synchronization with the rotating position of the work 7 when the work 7 is actually processed by the cutting tool 3. The cutting tool 3 is fixed to a fine adjustment device 14 which is fixedly mounted on the NC table 4. Reference numeral 15 denotes the electrical connection of signals among the parts of the apparatus and are understood to be general electrical wiring. FIG. 2 is a detailed side view of the fine adjustment device 14 of FIG. 1, wherein the cutting tool 3 is fixed to a fine adjustment stage 16. The fine adjustment stage 16 has a spring part 16a an end of which is fixed to a mounting stage 17. A piezoelectric element 18 has one end secured to the mounting stage 17, and the other end secured to the fine adjustment stage 16. The mounting stage 17 is fixedly set to the NC table 14.

The cutting apparatus with the movable cutting tool constructed as above operates in the following manner.

When the main shaft 2 is rotated, the work 7 is rotated in a direction of an arrow I in FIG. 1, whereby the shaft 8, used as a processing reference, is rotated while being deflected. In this state, that is, before the work 7 is cut, the two deflection detecting sensors 11a and 11b measure the respective deflection amount of the shaft 8 corresponding to the rotating position of the work 7 detected by the sensor 10.

The arithmetic unit 12 in turn calculates the correcting amount of the to-be-cut surface of the work 7 corresponding to the rotating position of the work 7 on the basis of the above measuring results. The calculation at this time will be depicted in detail with reference to FIG. 3.

Figure 3:
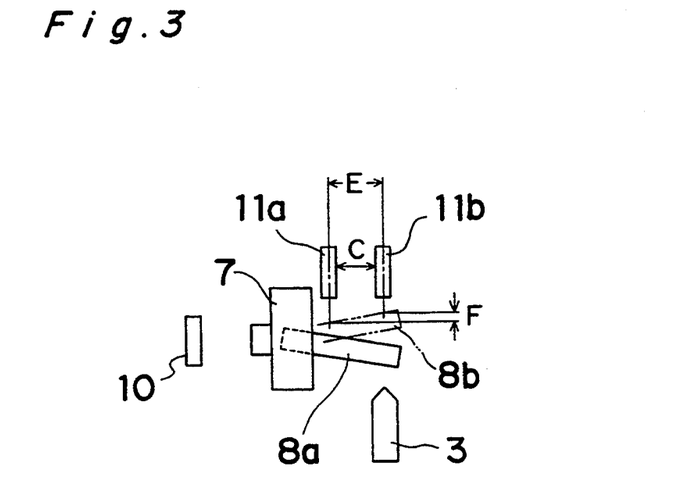
FIG. 3 is a diagram for explaining the synchronization of the cutting tool of the apparatus of FIG. 1.

Before the description, it is to be noted that only the cutting tool 3, the work 7 to be cut, the shaft 8, the rotating position detecting sensor 10, and two deflection detecting sensors 11a, 11b of FIG. 1 are shown in FIG. 3. The shaft 8 shown by a solid line in FIG. 3, i.e., represented by reference numeral 8a is at the position farthest from the deflection detecting sensors 11a and 11b. On the other hand, the shaft 8 at the closest position to the sensors 11a and 11b after the main shaft 2 is rotated 180° from the above state is indicated by a chain double-dashed line and denoted by reference numeral 8b. The two states of the shaft 8 as above can be easily specified, for example, from the positions of the maximum and minimum distances of the shaft 8 from the sensors 11a and 11b if the detecting sensors 11a and 11b are capacitance type distance sensors. The rotating position of the work 7 can be detected by the rotating position detecting sensor 10 mounted to the main shaft 2. Meanwhile, in order to maintain a constant distance between the shaft 8a and the cutting tool 3 at all times even after the main shaft 2 is rotated 180° and then the shaft 8a is moved to the position of the shaft 8b, that is, to reduce the relative deflection between the shaft 2 and the cutting tool 3, the cutting tool 3 should be moved minutely synchronously with the rotation of the main shaft 2 by the fine adjustment device 14 by the amount equal to each distance detected by the sensors 11a and 11b. Similarly, when the cutting tool 3 comes to each position of the detecting sensor 11a and 11b, the cutting tool 3 is moved by the distance detected by each of the sensors 11a and 11b synchronously with the main shaft 2. Accordingly, the shaft 8 shows no deflection relative to the cutting tool 3. Moreover, as shown in FIG. 3, even if the cutting tool 3 is at an optional position except for the sensors 11a and 11b, the cutting tool 3 is synchronously finely moved with the main shaft 2 as calculated according to a simple proportional calculation from the inclination of a difference E of the deflection amount detected by the sensors 11a and 11b corresponding to a distance E between the sensors 11a and 11b, thereby eliminating the relative deflection of the shaft 8 with respect to the cutting tool 3. The concrete operation of the fine adjustment device 14 will be described later. Needless to say, the outer peripheral surface of the work 7 is processed by using the shaft 8 as a processing reference such that the cutting tool 3 processes the outer peripheral surface of the work 7 with no relative deflection generated between the shaft 8 and the cutting tool 3. A general computer will perform calculations and store the calculating result.

One example of the calculations needed to find a cutting amount of the cutting tool 3 will be described below.

Figure 9A:
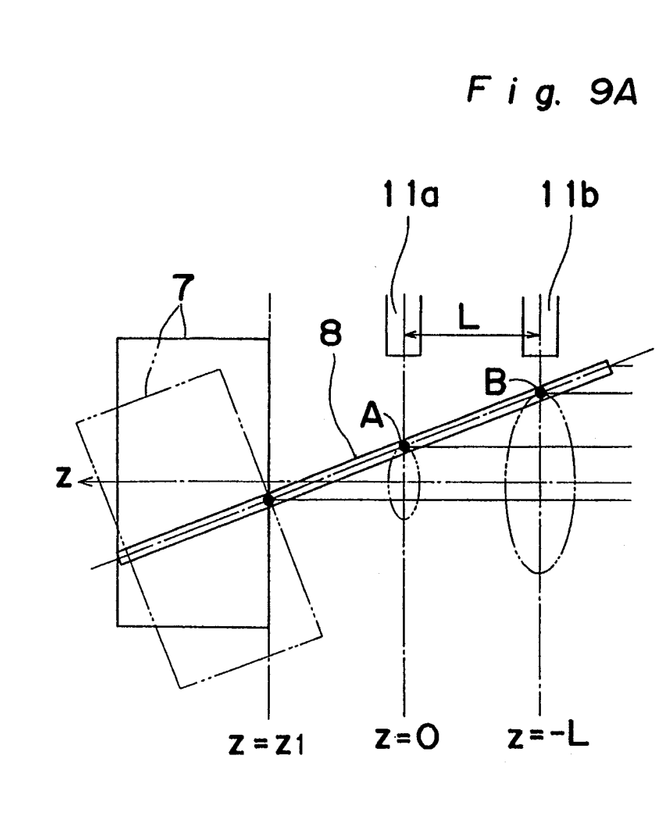
FIGS. 9A–9B are diagrams showing a model of the phenomenon in the embodiment.
Figure 9B:
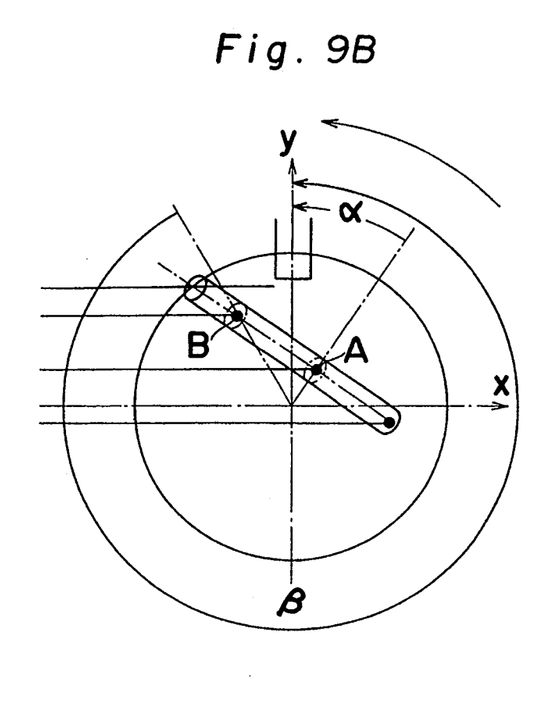
Figure 10:
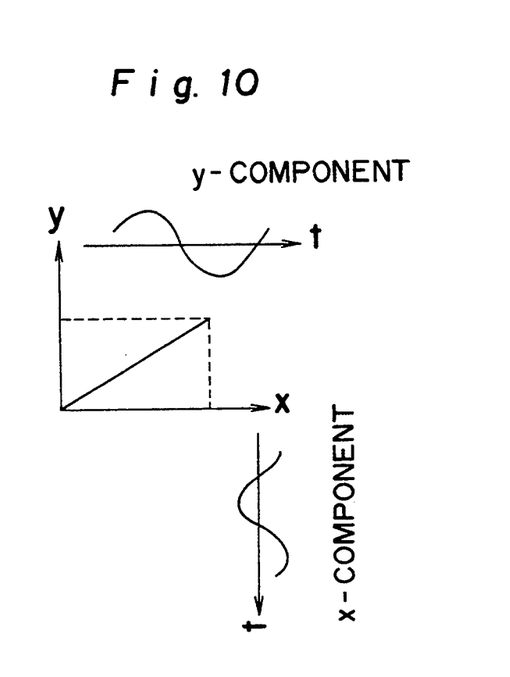
FIG. 10 is a diagram showing the relationship between an x-component and a y-component in FIG. 9.

Firstly, it is assumed that a model of the phenomenon in the cutting process is formed for analysis. As shown in FIGS. 9A–9B, the sensors 11a and 11b respectively generate output signals $V_A$ and $V_B$ which are expressed by the following expression: $V_A = a_0\cos(\omega t - \alpha)$, $V_B = b_0\cos(\omega t - \beta)$ where $a_0$ and $b_0$ are amplitudes of the output signals from the sensors 11a and 11b, and $\alpha$ and $\beta$ are phases of the output signals from the sensors 11a and 11b at a position as a reference. When the rotating direction of the shaft 8 is a z-axis and the sensors are arranged on a y-axis, the x-component in an x-axis is a value that a y-component is early appeared by 90 degree as shown in FIG. 10. Therefore, each y-component in the y-axis is advanced by $\pi/2$. Then, coordinates of points A and B on the center line of the shaft at a time t in FIG. 9 are $(a_0\cos(\omega t-\alpha+\pi/2), a_0\cos(\omega t-\alpha), 0)$, and $(b_0\cos(\omega t-\beta+\pi/2), b_0\cos(\omega t-\beta), -L)$, where L is distance between the sensors 11a and 11b. This calculation to get the coordinates of the points A and B is performed by using the formula: $\cos x = \sin(\pi/2-)$ x) as follows.

$$\begin{aligned} A_x &= a_0\cos(\omega t - \alpha + \pi/2) \\ &= a_0\sin\{\pi/2 - (\omega t - \alpha - \pi/2)\} \\ &= a_0\sin(-\omega t + \alpha) \\ &= -a_0\sin(\omega t - \alpha) \end{aligned}$$

$B_x$ is similar to $A_x$. Therefore, the points A and B are expressed by:

A point: $(-a_0\sin(\omega t-\alpha), a_0\cos(\omega t-\alpha), 0)$
B point: $(-b_0\sin(\omega t-\beta), b_0\cos(\omega-\beta), -L)$ The two coordinates of the points A and B are necessary to substitute in a linear expression described below.

Figure 11:
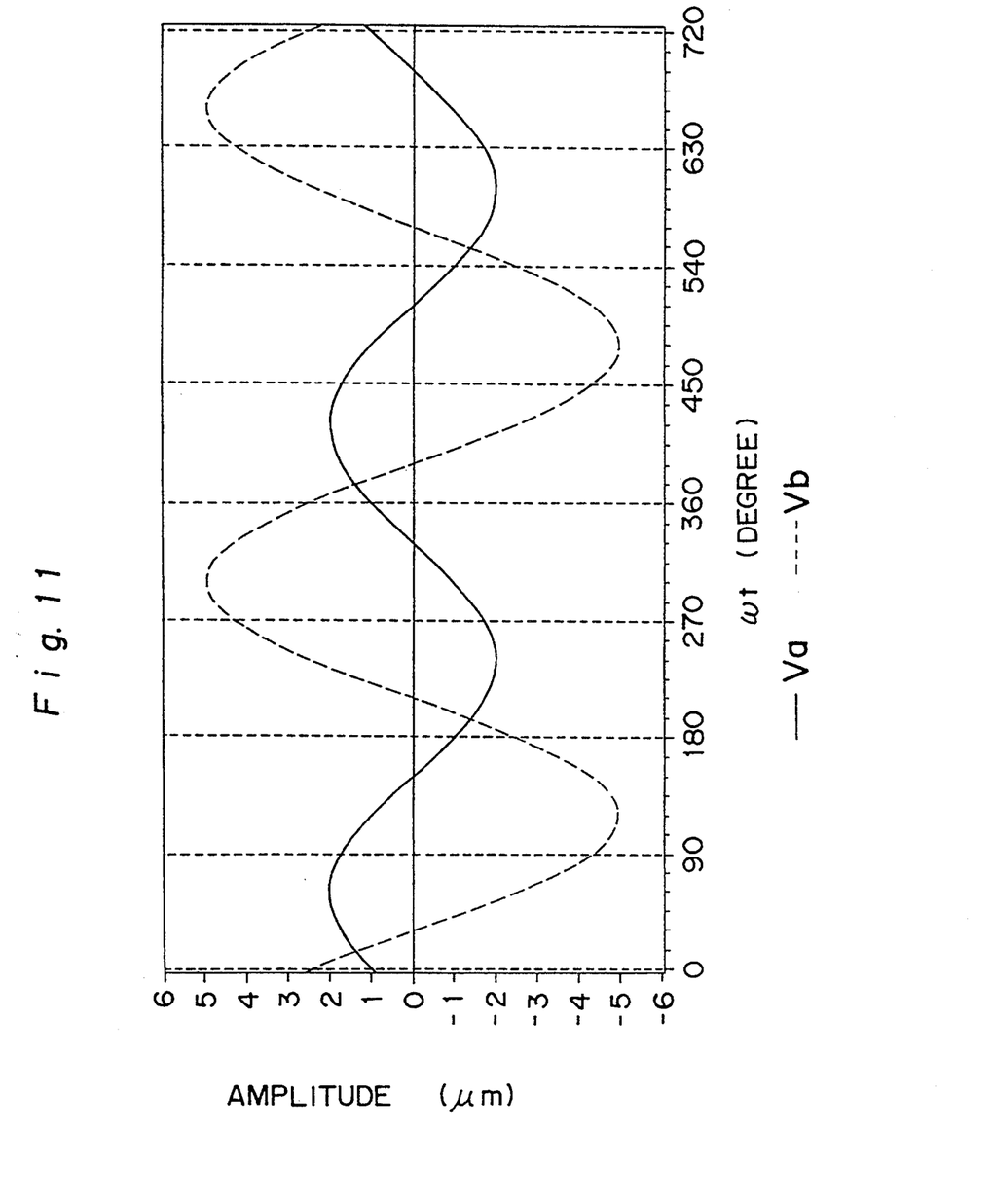
FIG. 11 shows one example of output signal waveforms of the sensors 11a and 11b when $a_0 = 2$ μm, and $\alpha = 60°$; and $b_0 = 5$ μm, $\beta = 300°$.

FIG. 11 shows one example of output signal waveforms of the sensors 11a and 11b when $a_0=2$ μm, $\alpha=60°$; and $b_0=5$ μm, $\beta=300°$.

Next, motion around the outer peripheral surface is described below.

A linear expression passing through two points $(A_x, A_y, A_z)$ and $(B_x, B_y, B_z)$ in a space is as follows:

$$\frac{x - A_x}{B_x - A_x} = \frac{y - A_y}{B_y - A_y} = \frac{z - A_z}{B_z - A_z}$$

Here, when the above calculated coordinates of the points A and B are substituted in the linear expression, the following expression is found:

$$\frac{x + a_0\sin(\omega t - \alpha)}{-b_0\sin(\omega t - \beta) + a_0\sin(\omega t - \alpha)}$$

$$= \frac{y - a_0\cos(\omega t - \beta)}{b_0\cos(\omega t - \beta) - a_0\cos(\omega t - \beta)}$$

$$= \frac{z - 0}{-L - 0}$$

This expression is transformed into the following expression:

$$\frac{x + a_0\sin(\omega t - \alpha)}{b_0\sin(\omega t - \beta) - a_0\sin(\omega t - \alpha)} \quad (1)$$

$$= \frac{y - a_0\cos(\omega t - \alpha)}{a_0\cos(\omega t - \alpha) - b_0\cos(\omega t - \beta)}$$

$$= \frac{z}{L}$$

Based on the above expression (1), the y-coordinate of a point on the center line of the shaft 8 at a position $z=z_1$ is found:

$$\begin{aligned} y_1 &= \frac{z_1}{L} (a_0\cos(\omega t - \alpha) - b_0\cos(\omega t - \beta)) + a_0\cos(\omega t - \alpha) \\ &= \frac{z_1 + L}{L} a_0\cos(\omega t - \alpha) - \frac{z_1}{L} b_0\cos(\omega t - \beta) \\ &= \frac{z_1 + L}{L} V_A - \frac{z_1}{L} V_B \end{aligned}$$

For simplification, the expression is changed into an expression of $z_1$ that changes in real time.

$$\text{output value: } y_1 = \frac{V_A - V_B}{L} z_1 + V_A$$

Figure 12:
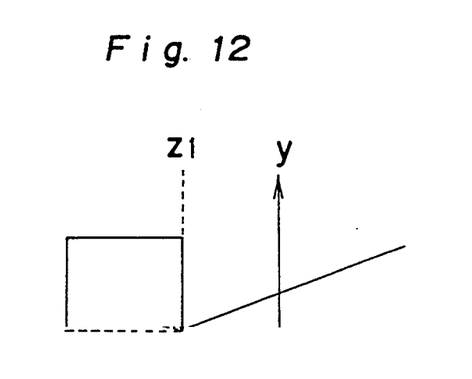
FIG. 12 a diagram showing a cutting amount of the cutting tool.

Therefore, $(V_A-V_B)/L$ is calculated to get data for the number of output pulses. This y-coordinate itself indicates a cutting amount of the cutting tool as shown in FIG. 12.

Next, the motion of the end face is described below.

Figure 13:
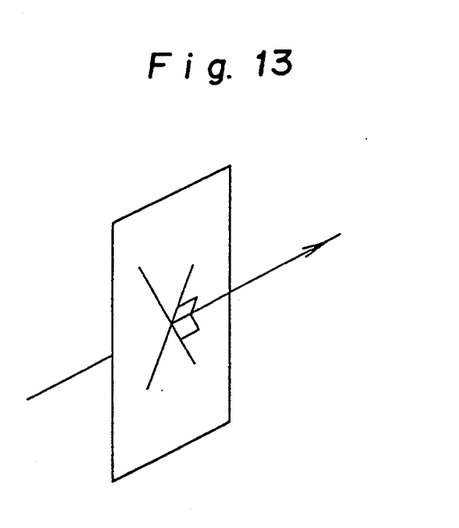
FIG. 13 is a diagram showing a directional vector of a straight line and a normal line vector of a plane.

As shown in FIG. 13, an equation of a plane perpendicular to a straight line passing through the points A and B is as follows: $A(A_x, A_y, A_z)$, $B(B_x, B_y, A_z)$. A directional vector of the straight line is: $(A_x-B_x, A_y-B_y, A_z-B_z)$. This is equal to the normal vector of the plane to be found. Then, an equation of the plane is $(A_x-B_x)x+(A_y-B_y)y+(A_z-B_z)z=d$, where d is a constant. The coordinate of the point A when the plane passes through the point A is substituted in (x,y,z) to find d, while the coordinate of the point B when the plane passes through the point B is substituted in (x,y,z) to find d. That is, $$(b_0 \sin(\omega t-\beta) - a_0 \sin(\omega t-\alpha))x + ((a_0 \cos(\omega t-\alpha) - b_0 \cos(\omega t-\beta))y + Lz = d \quad (2)$$

In this equation (2), the value d is a unknown value. Supposing that the plane passes through the point A, the coordinate of the point A is substituted in the equation (2) to determine the unknown value d. That is, $$d = -a_0\sin(\omega t - \alpha)(b_0\sin(\omega t - \beta) - a_0\sin(\omega t - \alpha))$$

$$+ a_0\cos(\omega t - \alpha)(a_0\cos(\omega t - \beta) - b_0\cos(\omega t - \beta))$$

$$= -a_0b_0(\sin(\omega t - \alpha)\sin(\omega t - \beta) +$$

$$\cos(\omega t - \alpha)\cos(\omega t - \beta)) + a_0^2$$

$$= a_0^2 - a_0b_0\cos(\alpha - \beta)$$

Figure 15:
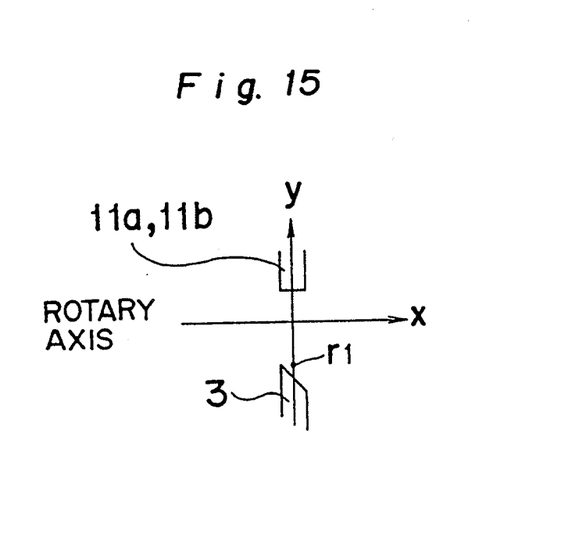
FIG. 15 is a diagram showing a state where the center of the cutting tool is located on a straight line of $x = 0$, and $y = r_1$.

Here, the center of the cutting tool is located on a straight line of x=0 and y=$r_1$ as shown in FIG. 15, and $z_1$ of the z-coordinate at an intersection point with the equation (2) is:

$$z_1 = \frac{a_0}{L}(a_0 - b_0\cos(\alpha - \beta)) - \frac{r_1}{L}(a_0\cos(\omega t - \alpha) -$$

$$b_0\cos(\omega t - \beta))$$

$$= \frac{a_0}{L}(a_0 - b_0\cos(\alpha - \beta)) - \frac{r_1}{L}(V_A - V_B)$$

Here, for simplification, supposing that other elements than $r_1$ are constant, an expression for $r_1$ is found. output value:

$$z_1 = -\frac{V_A - V_B}{L}r_1 + \frac{1}{L}(a_o^2 - a_0b_0\cos(\alpha - \beta))$$

Figure 14:
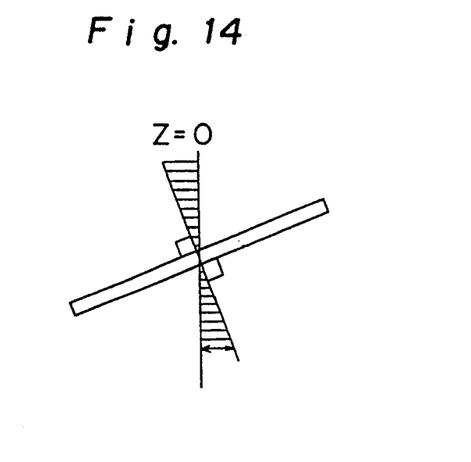
FIG. 14 is a diagram showing the relationship between the shaft and the cutting amount.

Here, the elements other than for $r_1$, have been previously calculated. This z-coordinate itself indicates a cutting amount of the cutting tool as shown in FIG. 14.

Now, the output circuit 13 will be described.

The output circuit 13 generates the calculating result corresponding to the position of the cutting tool 3 in the axial direction of the shaft 8 to the piezoelectric element 18 synchronously with the rotating position of the main shaft 2 when the work 7 is cut by the cutting tool 3. Therefore, the position of the cutting tool 3 in the axial direction of the shaft 8 should be inputted from the control device 5 as the position of the NC table 4 to which the fine adjustment device 14 is secured. Thereafter, the rotating position of the detecting sensor 10 provided in the main shaft 2 is inputted as the rotating position of the work 7. The calculating results corresponding to the above two signals are synchronously outputted easily by a known controlling arrangement or method.

The operation of the fine adjustment device 14 will be described with reference to FIG. 2.

The fine adjustment device 14 moves the cutting tool 3 minutely by a predetermined amount, for example, about ±18 μm, on the basis of the signal outputted from the output circuit 13. The piezoelectric element 18 is used as a driving source to deflection the cutting tool 3 in response to the signal from the output circuit 13. The piezoelectric element 18 has one end secured to the mounting stage 17 of sufficient rigidity, and the other end fixed to the fine adjustment stage 16 having the spring parts 16a. When the signal from the output circuit 13 is inputted to the piezoelectric element 18, the piezoelectric element 18 expands and contracts by itself, thereby deforming the spring parts 16a. As a result, the fine adjustment stage 16 is finely moved. Since the driving voltage of the piezoelectric element 18 is generally several hundreds volts and shows hysteresis, in many cases, the signal of the output circuit 13 is amplified by an amplifier circuit and the deflection amount of the fine adjustment stage 16 is controlled to be a predetermined value through feed-back control with using a deflection sensor 20 for measuring the deflection of the fine adjustment stage 16.

Although the foregoing embodiment is related to the case where the outer peripheral surface of the work 7 is processed based on the shaft 8 as a processing reference, the correcting amount can be calculated in any direction of the work 7 since the deflection of the shaft 8 and the center of the deflection are fundamentally calculated from the signals of the sensors 11a and 11b corresponding to the rotating position of the main shaft 2. Therefore, if the correcting amount of an end face of the work 7 is calculated likewise, and a fine adjustment device and a cutting tool (not shown) enabling the fine adjustment in the direction are provided in the NC table 4, it is possible to process the end face of the work 7 using the shaft as a processing reference. Moreover, it is certainly applicable also to the work 9 of a rod shown in FIG. 18.

A second embodiment of the present invention will now be discussed with reference to FIG. 4.

Figure 4:
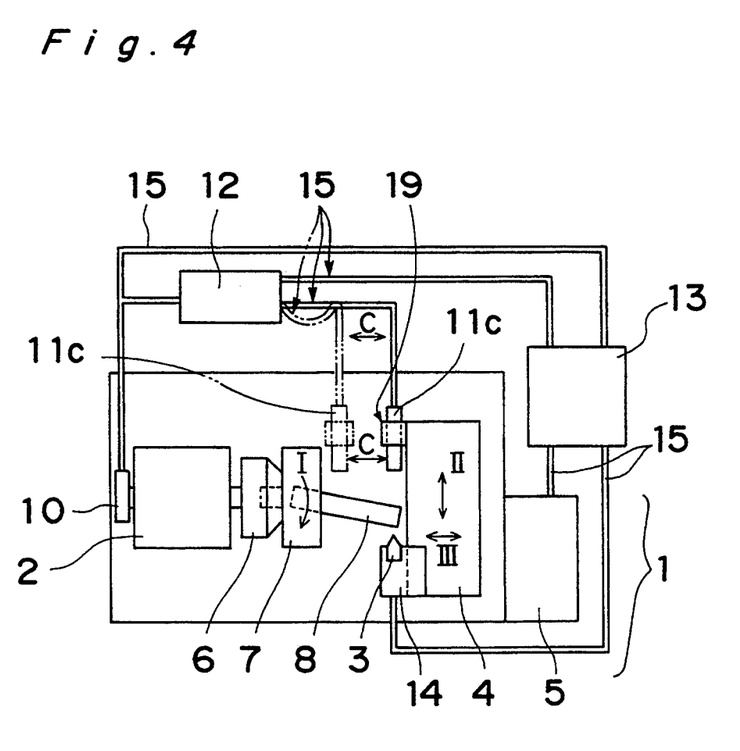
FIG. 4 is a schematic plane view of a cutting apparatus with a movable cutting tool according to a second embodiment of the present invention.

FIG. 4 is a schematic plane view of a cutting apparatus with a movable cutting tool according to a second embodiment of the present invention. The parts of the same function as in the prior art are denoted by the same reference numerals in FIG. 4, specifically, 1 is an NC cutting apparatus; 2 is a main shaft; 3 is a cutting tool; 4 is an NC table (XY table); and 5 is a control device for controlling the NC cutting apparatus 1 and the NC table 4. A chuck 6 provided in the main shaft 2 holds a to-be-processed work 7 to which a shaft 8 is fixed. The shaft 8 is used as a processing reference to the work 7. In the drawing, the shaft 8 is inclined to be deflected by the rotation of the main shaft 2.

A difference of the second embodiment from the first embodiment is that the deflection detecting sensor 11c is constituted as a single measuring part, not including a plurality of measuring parts as in the first embodiment. The deflection detecting sensor 11c mounted to the NC table 4 is freely movable together with the NC table 4. Accordingly, the deflection detecting sensor 11c detects the deflection of the shaft 8, namely, the deflection in the vicinity of the front end of the shaft 8 and in the vicinity of the fixed end of the shaft 8 corresponding to the rotating position of the work 7 detected by the rotating position detecting sensor 10 when the NC table 4 is moved in directions of arrows II and III. The sensor 11c present in the vicinity of the front end of the shaft 8 is indicated by a solid line, and that in the vicinity of the fixed end of the shaft 8 is indicated by a chain double-dashed line. In comparison with the deflection detecting sensor of the first embodiment consisting of a plurality of sensors 11a and 11b which have different sensitivity characteristics, the deflection detecting sensor 11c of the second embodiment is able to measure the deflection of the shaft with higher accuracy. Thus, the processing accuracy of the work can be more improved.

Third and fourth embodiments of the present invention will be described with reference to FIG. 5.

Figure 5:
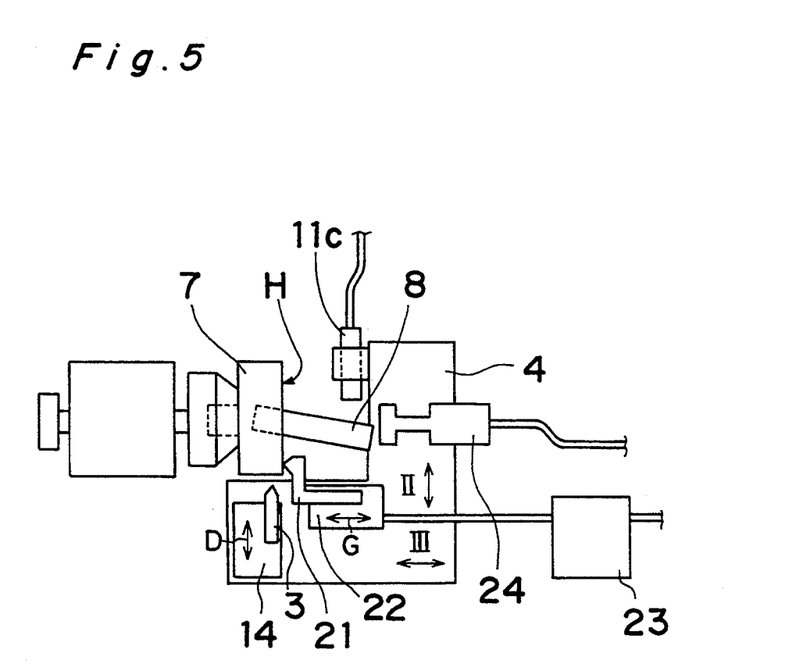
FIG. 5 is a schematic plane view of a cutting apparatus with a movable cutting tool according to third and forth embodiments of the present invention.

In FIG. 5, the NC table 4 of the apparatus is equipped with not only the fine adjustment device 14 and the cutting tool 3 of the second embodiment, but a second fine adjustment device 22 and a second cutting tool 21. The second fine adjustment device 22 is driven by an output circuit 23. According to the third embodiment, the end face (represented by a reference character H) as well as the outer peripheral surface of the work 7 can be processed while the perpendicularity to the shaft 8 is favorably maintained.

On the other, in the fourth embodiment, the cutting apparatus has an end face position detecting sensor 24 in addition to the construction of the third embodiment. The end face position detecting sensor 24 detects a position of an end face of the shaft 8 after being chucked or a suitable surface of the work 7 serving as a processing reference. According to the fourth embodiment, the height can be processed with higher accuracy between the end face (represented by the reference character H) of the shaft 8 and a surface detected by the end face position detecting sensor 24 thereby to determine the biting amount (cutting amount).

Figure 6:
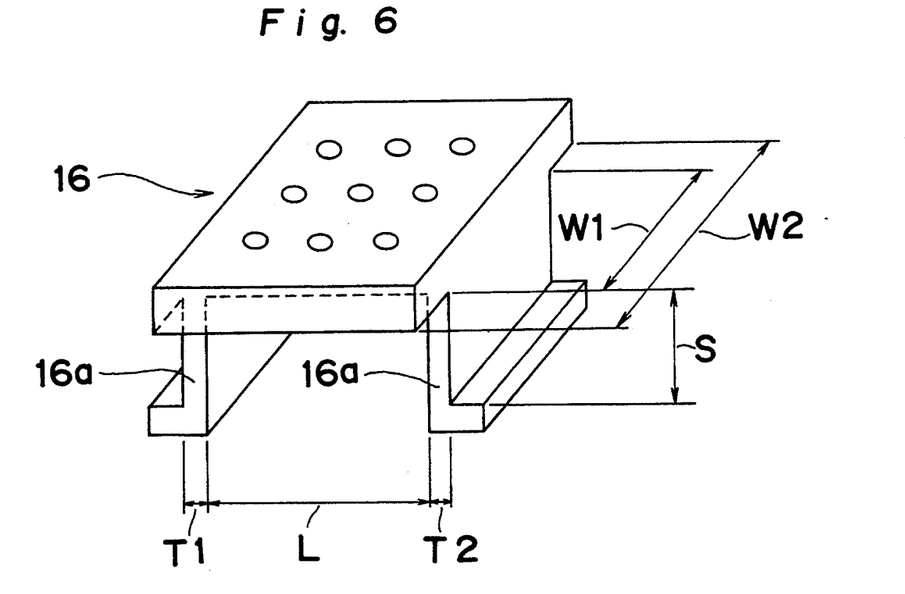
FIG. 6 is a perspective view of a fine adjustment stage of a cutting apparatus with a movable cutting tool according to fifth through seventh embodiments of the present invention.
Figure 7:
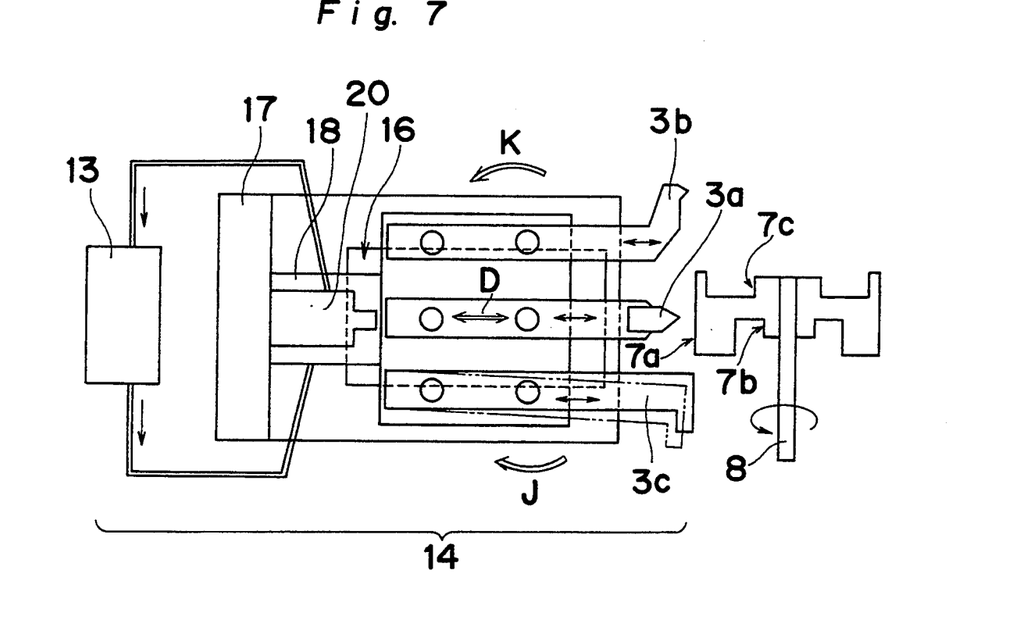
FIGS. 7 and 8 are a schematic plane view and a schematic side view of a cutting apparatus with a movable cutting tool according to fifth through seventh embodiments of the present invention.
Figure 8:
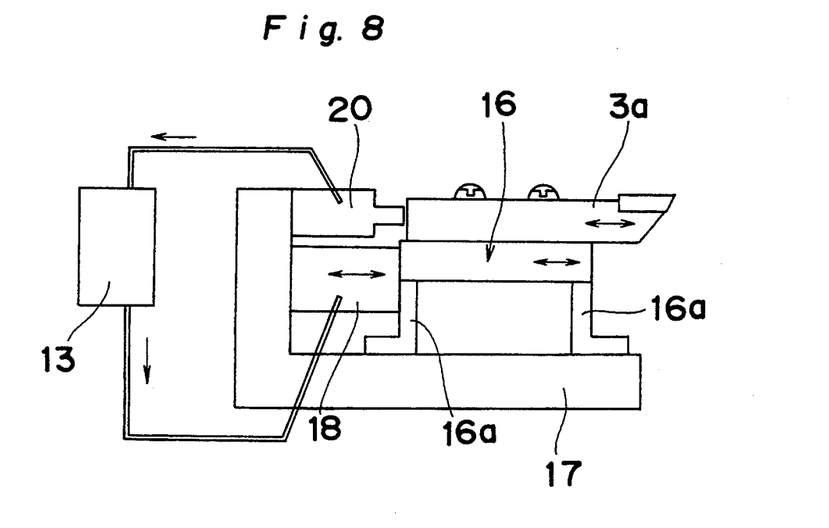

A fifth embodiment of the present invention will be described with reference to FIGS. 6–8.

The fifth embodiment is different from the first through third embodiments in the configuration of the fine adjustment stage 16, and a plurality of cutting tools 3 fixed to the fine adjustment stage 16. Although in a rare case, only one cutting tool is used in a processing operation, in general, the processing operation is performed by the cutting tools 3a, 3b, and 3c of different configurations. If the three cutting tools 3a, 3b, and 3c are moved by three fine adjustment devices 14, some problems are caused in that the three cutting tools 3a, 3b, and 3c can not be mounted on the NC table 4 and the cost for mounting them is increased. Such problems can be solved by the fifth embodiment. That is, as shown in FIG. 6, in order to fix the three cutting tools 3a, 3b, and 3c to the NC table 4, the table 4 is constructed so that the width W2 of the fine adjustment stage 16 is larger than the width W1 of the spring part 16a. Thus, even when a work is processed by the three cutting tools 3a, 3b, and 3c, these three cutting tools 3a, 3b, and 3c can be mounted on the NC table 4 with a lower cost. When the number of the cutting tools is small, the widths W1 and W2 are equal to each other.

A sixth embodiment of the present invention will be described with reference to FIGS. 6–8.

The sixth embodiment is different from the fifth embodiment in the configuration of the spring parts 16a of the fine adjustment stage 16. Since the fine adjustment stage 16 is fixed to the mounting stage 17 via the spring parts 16a, the fine adjustment stage 16 is so constructed by utilizing a parallel spring as the spring parts 16a that the stage 16 is movable in only a direction shown by an arrow D in FIG. 7. The processing surface 7b of the work 7 is processed by the cutting tool 3b, and then the torsional moment in a direction shown by an arrow K is generated. The processing surface 7c of the work 7 is processed by the cutting tool 3c, and then the torsional moment in a direction shown by an arrow J is generated. Even though the processing surface 7a of the work 7 is processed by the cutting tool 3a, only a reaction force in a direction shown by the arrow D is generated in the cutting process and any torsional moment is not be generated. However, the fine adjustment device 14 is fed in the axial direction of the shaft 8 from the above state to generate torsional moment. The torsional moment causes the fine adjustment stage 16 to be slightly deformed by, for example, one micron meter in a direction where the torsional moment is generated, thus decreasing the processing accuracy. In the sixth embodiment, in order to significantly reduce the decrease of the processing accuracy generated by the torsional moment, as shown in FIG. 6, the relationship between the thickness T1 and T2 and the height S of the spring part 16a of the fine adjustment stage 16 and the distance L between the spring parts 16a is expressed by the following expressions:

$L \geq W1 > S > T1$, and $L \geq W1 > S > T2$.

Thus, the stiffness of the fine adjustment stage 16 to the torsional moment is assured. In one example, the fine adjustment stage 16 of T1=T2=1 mm, W1=L=40 mm is made of stainless steel SUS420J2 so that fine movement of 2–3 $\mu$m is caused by 1 kgf-force.

A seventh embodiment of the present invention will be described below with reference to FIG. 6. The seventh embodiment is different from the sixth embodiment in the configuration of the spring part 16a of the fine adjustment stage 16 so as to fix the three cutting tools 3a, 3b, and 3c to the fine adjustment stage 16. That is, in FIG. 6, the relationship between the width W2 of the portion of the fine adjustment stage 16 for mounting the cutting tools and the width W1 of the spring part 16a is expressed by $W2 \geq W1$ and the expressions: $L \geq W1 > S > T1$, and $L \geq W1 > S > T2$ are satisfied. Thus, there is no practical problem in the stiffness of the fine adjustment stage 16 to any torsional moment, and a plurality of cutting tools 3a, 3b, and 3c are easily fixed to the fine adjustment stage 16.

According to the embodiments, a work is processed by a cutting tool with respect to a processing reference with good concentricity and squareness.

The piezoelectric element 18 can be a linear motor or a proportional-control type electromagnetic solenoid, etc.

Not only can a capacitive distance sensor be used, but an eddy current sensor or a similar electrical sensor or microsensor can be employed as the deflection detecting sensors.

Although the processing reference surface is the outer peripheral surface of the shaft 8 and the work 9 in the first and second embodiments and the deflection of the reference surface is detected by the deflection detecting sensor, the following alternative can be used: the processing reference surface is the end face of the work, the deflection of the reference surface is detected by the deflection detecting sensor, the processing amount is calculated and then the fine adjustment device is finely moved by the correcting amount based on the calculating result to process the work by the cutting tool.

Although the fine adjustment device capable of moving in the direction of the arrow II in FIG. 1 is mounted on the NC table 4, a fine adjustment capable of moving in the direction of the arrow III and the corresponding cutting tool can be provided. Alternatively, a fine adjustment capable of moving in the directions of the arrows II and III and the corresponding cutting tools can be provided.

Moreover, instead of providing the rotating position detecting sensor 10 in the main shaft 2, a rotating position detecting sensor of the main shaft 2 can be utilized if built in the NC cutting apparatus itself, or the rotating position of the work 7 or the shaft 8 may be measured directly. Although the calculation result is once stored and the necessary correcting amount is synchronously outputted afterwards in the embodiments, the correcting amount can be instantaneously calculated and outputted based on each position of the cutting tool 3 and the main shaft 2.

Although the foregoing embodiments are described in the cutting process wherein the cutting tool is used, the present invention can be applied to another processing operation such as a milling process wherein a milling cutter is used, and a polishing or lapping process wherein a polishing or lapping tool is used.

In the processing apparatus such as the cutting apparatus with the movable cutter of the present invention, there are arranged the deflection detecting sensor for detecting the deflection amount of a processing reference surface of a work held by the chuck mounted to the main shaft, the rotating position detecting sensor for detecting the rotating position of the work, the arithmetic unit for calculating the correcting amount of the cutting tool at a processing point of the work from the measuring values of the deflection detecting sensor and the rotating position detecting sensor, the output circuit for outputting the correcting amount synchronously with the rotating position and the processing point of the work, the fine adjustment device for finely moving the cutting tool as one example of a processing tool based on the output signal of the output circuit, and the NC table to which the fine adjustment device is fixed. Even when the processing reference surface is deflected, the cutting tool is synchronously moved finely, so that the cutting accuracy is enhanced superbly.

According to the arrangement of the present invention, the deflection amount of the processing reference surface of the work held by the chuck is measured at a plurality of points corresponding to the rotating position of the work before the work is cut, and the relationship between the deflection amount of the whole cutting surface of the work and the rotating position, i.e., the correcting amount is calculated from the measuring result. At the actual cutting time, a processing point of the work (a contact point between the cutting tool and the work) and the correcting amount corresponding to the rotating position of the work are synchronously outputted from the output circuit. The cutting tool is finely moved by the correcting amount on the basis of this output from the output circuit, so that the cutting tool and the work are maintained relative to each other without a deflection. Thereafter, the work is processed normally as in the case using a general NC cutting apparatus. Accordingly, even the work having the processing reference surface deflected to the cutting tool can be processed with high accuracy in the same fashion as if without a deflection.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed:

1. A processing apparatus with a movable processing tool, which comprises:

a deflection detecting device for detecting a plurality of deflection amounts at points which are axially spaced on a processing reference surface of a to-be-processed work which is held by a work holding member mounted to a main shaft of an NC processing apparatus;

a rotating position detecting sensor for detecting a rotating position of the work;

an arithmetic unit for calculating a correcting amount of the processing tool at a processing point of the work from a measured value of the rotating position detecting sensor and a plurality of measured values of the deflection amounts of the deflection detecting device;

an output circuit for outputting the correcting amount synchronously with the rotating position and the processing point of the work;

a fine adjustment device having the processing tool fixed thereto for finely moving the processing tool in plural processing directions based on an output from the output circuit; and an XY table to which the fine adjustment device is secured.

2. The processing apparatus as claimed in claim 1, wherein the deflection detecting device has two deflection detecting sensors and unmovably arranged at positions corresponding in the vicinity of both ends of the work in its axial direction to detect the plural deflection amount of the processing reference surface of the work.

3. The processing apparatus as claimed in claim 1, wherein the deflection detecting device has a deflection detecting sensor and a moving device for moving the sensor in an axial direction of the main shaft to detect the plural deflection amount of the processing reference surface of the work at positions corresponding in the vicinity of both ends of the work in its axial direction.

4. The processing apparatus as claimed in claim 3, wherein the moving device is the XY table.

5. The processing apparatus as claimed in claim 1, wherein the fine adjustment device is secured to the XY table and then moves in directions approximately parallel to and approximately perpendicular to the main shaft.

6. The processing apparatus as claimed in claim 2, wherein the fine adjustment device is secured to the XY table and then moves in directions approximately parallel to and approximately perpendicular to the main shaft.

7. The processing apparatus as claimed in claim 3, wherein the fine adjustment device is secured to the XY table and then moves in directions approximately parallel to and approximately perpendicular to the main shaft.

8. The processing apparatus as claimed in claim 1, further comprising an end face position detecting sensor provided at a position facing to the work holding member mounted to the main shaft for detecting a position of the work in a longitudinal direction of the work.

9. The processing apparatus as claimed in claim 2, further comprising an end face position detecting sensor provided at a position facing to the work holding member mounted to the main shaft for detecting a position of the work in a longitudinal direction of the work.

10. The processing apparatus as claimed in claim 3, further comprising an end face position detecting sensor provided at a position facing to the work holding member mounted to the main shaft for detecting a position of the work in a longitudinal direction of the work.

11. The processing apparatus as claimed in claim 1, wherein the fine adjustment device has a fine adjustment stage with a spring part and a processing tool fitting part, and an expansion device for adding a deflection to the spring part, and the spring part satisfies dimensional relationship: $L \geq W1 > S > T1$, and $L \geq W1 > S > T2$ where T1 and T2 indicate thickness, S is height, and W1 is width of the spring part.

12. The processing apparatus as claimed in claim 2, wherein the fine adjustment device has a fine adjustment stage with a spring part and a processing tool fitting part, and an expansion device for adding a deflection to the spring part, and the spring part satisfies dimensional relationship: $L \geq W1 > S > T1$, and $L \geq W1 > S > T2$ where T1 and T2 indicate thickness, S is height, and W1 is width of the spring part.

13. The processing apparatus as claimed in claim 11, wherein the spring part satisfies a dimensional relationship $W2 > W1$ where W2 indicates width of the processing tool fitting part of the fine adjustment device.

14. The processing apparatus as claimed in claim 12, wherein the spring part satisfies a dimensional relationship $W2 > W1$ where W2 indicates width of the processing tool fitting part of the fine adjustment device.

15. The processing apparatus as claimed in claim 11, wherein the expansion device is a piezoelectric device.

16. The processing apparatus as claimed in claim 12, wherein the expansion device is a piezoelectric device.

17. The processing apparatus as claimed in claim 1, wherein the processing tool is a cutting tool.

18. The processing apparatus as claimed in claim 1, wherein the processing tool is a milling cutter.

19. The processing apparatus as claimed in claim 1, wherein the processing tool is a polishing or lapping tool.

* * * * *